United States Patent
Pearson et al.

(10) Patent No.: US 11,681,062 B2
(45) Date of Patent: Jun. 20, 2023

(54) SYSTEM AND A METHOD FOR VIBRATION MONITORING

(71) Applicant: SYSTEMES DE CONTROLE ACTIF SOFT DB INC., Québec (CA)

(72) Inventors: Michel Pearson, Quebec (CA); Anthony Gerard, Montreal (CA); Pierre-Claude Ostiguy, Verdun (CA); Philippe Laliberte, Quebec (CA)

(73) Assignee: SYSTEMES DE CONTROLE ACTIF SOFT DB INC., Quebec (CA)

( * ) Notice: Subject to any disclaimer, the term of this patent is extended or adjusted under 35 U.S.C. 154(b) by 219 days.

(21) Appl. No.: 17/093,903

(22) Filed: Nov. 10, 2020

(65) Prior Publication Data
US 2021/0141106 A1 May 13, 2021

Related U.S. Application Data

(60) Provisional application No. 62/934,177, filed on Nov. 12, 2019.

(51) Int. Cl.
*G01V 1/00* (2006.01)
*G01V 1/16* (2006.01)
(Continued)

(52) U.S. Cl.
CPC ............... *G01V 1/003* (2013.01); *G01V 1/16* (2013.01); *G01V 1/22* (2013.01); *G01V 1/24* (2013.01); *G01V 2210/14* (2013.01)

(58) Field of Classification Search
CPC . G01V 1/003; G01V 1/16; G01V 1/22; G01V 1/24; G01V 2210/14
See application file for complete search history.

(56) References Cited

U.S. PATENT DOCUMENTS

| 3,886,494 A | * | 5/1975 | Kostelnicek | G01V 1/223 367/77 |
| 4,042,906 A | * | 8/1977 | Ezell | G01V 1/223 367/67 |
| 6,002,339 A | * | 12/1999 | Norris | G01V 1/26 367/27 |

FOREIGN PATENT DOCUMENTS

| AU | 5789673 A | | 1/1975 |
| CN | 102680784 A | * | 9/2012 |

(Continued)

*Primary Examiner* — Isam A Alsomiri
*Assistant Examiner* — Abdallah Abulaban
(74) *Attorney, Agent, or Firm* — Lavery, De Billy, LLP; Gwendoline Bruneau

(57) ABSTRACT

A system, a method and an autonomous network for vibration monitoring, the system comprising a master station preset for recording vibrations at a master trigger threshold; a secondary station, the secondary station and the master station being time synchronized, a server in communication with the master and secondary stations; wherein, the master station is configured to transmit a master trig time to the server and to start recording vibrations when the master trigger threshold is exceeded; the server is configured to store the master trig time; the secondary station is configured to detect the master trig time stored by the server, and upon detecting the master trig time, to record vibrations; and wherein the master and secondary stations are configured to transmit respective recorded vibrations to the server and the server is configured to classify the recorded vibrations in relation to a preset seismic threshold.

20 Claims, 3 Drawing Sheets

(51) Int. Cl.
*G01V 1/24* (2006.01)
*G01V 1/22* (2006.01)

(56) References Cited

FOREIGN PATENT DOCUMENTS

| EP | 0182452 A1 | 5/1986 |
| FR | 2435730 A1 | 4/1980 |
| WO | 98/08113 A1 | 2/1998 |

\* cited by examiner

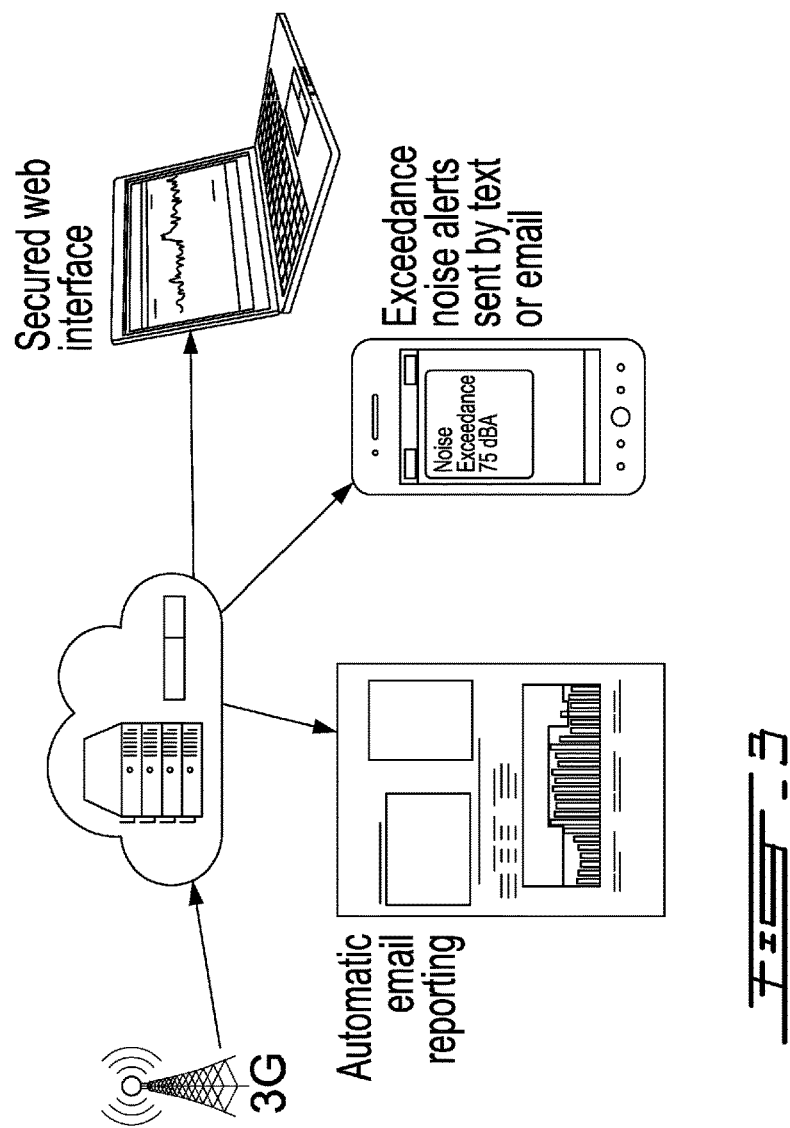
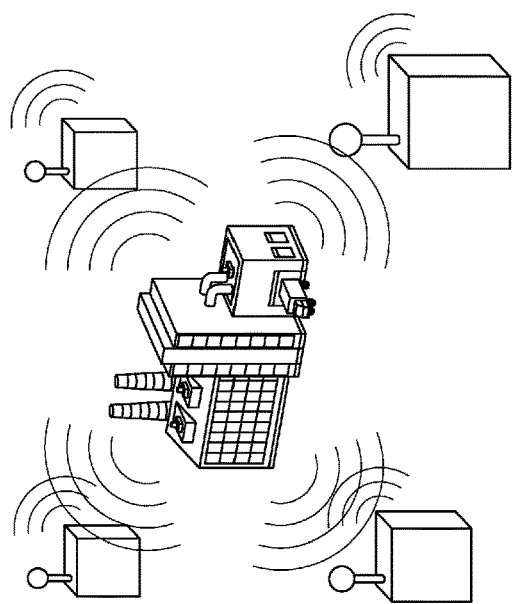
FIG. 3

SYSTEM AND A METHOD FOR VIBRATION MONITORING

CROSS REFERENCE TO RELATED APPLICATIONS

This application claims benefit of U.S. provisional application Ser. No. 62/934,177, filed on Nov. 12, 2019. All documents above are incorporated herein in their entirety by reference.

FIELD OF THE INVENTION

The present invention relates to vibration monitoring. More precisely, the present invention relates to a system and a method for vibration monitoring.

BACKGROUND OF THE INVENTION

In a number of industries such as mines and quarries for example, vibration events are monitored and controlled to meet operational and/or regulation criteria. For example, maximum allowable vibration levels may be set in sensitive sectors in the neighborhood of the operating site, such as facilities or residential areas that may be impacted by vibrations originating in the operating site. The levels of vibrations, including displacement, speed and acceleration, thus need be monitored, to ensure the mine or quarry or other operating site complies with the regulations. Monitoring data may be also be used to optimize operations of the operating sites themselves in relation to vibration events.

However, vibration sensors used to measure vibration events originating in the operating sites also detect vibration events such as traffic-related vibrations on adjacent roads for example, which are unrelated to the operating sites. Such unrelated vibration events are typically of a variable intensity and unforecastable. They may interfere with the assessment of vibration events originating in the operating sites and/or trigger numerous recordings.

There is still a need in the art for a system and a method for vibration monitoring.

SUMMARY OF THE INVENTION

More specifically, in accordance with the present invention, there is provided a system for vibration monitoring, comprising a master station preset for recording vibrations at a master trigger threshold; a secondary station, the secondary station and the master station being time synchronized, a server in communication with the master and secondary stations; wherein, the master station is configured to transmit a master trig time to the server and to start recording vibrations when the master trigger threshold is exceeded; the server is configured to store the master trig time; the secondary station is configured to detect the master trig time stored by the server, and upon detecting the master trig time, to record vibrations; and wherein the master and secondary stations are configured to transmit respective recorded vibrations to the server and the server is configured to classify the recorded vibrations in relation to a preset seismic threshold.

There is further provided a method for vibration monitoring, comprising positioning a master station preset for vibration recording at a master trigger threshold at a first position; positioning at least one secondary station in a second position impacted by vibrations occurring in the first position, the at least one secondary station continuously recording a time length of vibrations at the second position; synchronizing the at least one secondary station and the master station in time; connecting the master station and the secondary station to a server; whereby, when the master trigger threshold is exceeded, the master station transmits a master trig time to the server and starts recording vibrations; the server storing the master trig time; the at least one secondary station detecting the master trig time stored by the server, and upon detecting the master trig time, starts recording vibrations; the master and the at least one secondary station transmitting respective recorded vibrations to the server and the server classifying received recorded vibrations in relation to a preset seismic threshold.

There is further provided an autonomous interconnected network for vibration monitoring, comprising a master station preset for recording vibrations at a master trigger threshold; a secondary station, the secondary station and the master station being time synchronized, a server in communication with the master and secondary stations; wherein, the master station is configured to transmit a master trig time to the server and to start recording vibrations when the master trigger threshold is exceeded; the server is configured to store the master trig time; the secondary station is configured to detect the master trig time stored by the server, and upon detecting the master trig time, to record vibrations; wherein the master and secondary stations are configured to transmit respective recorded vibrations to the server and the server is configured to classify the recorded vibrations in relation to a preset seismic threshold.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 3 is a schematical view of a system according to an embodiment of an aspect of the present disclosure.

DESCRIPTION OF THE INVENTION

The present invention is illustrated in further detail by the following non-limiting examples.

Figure 1:
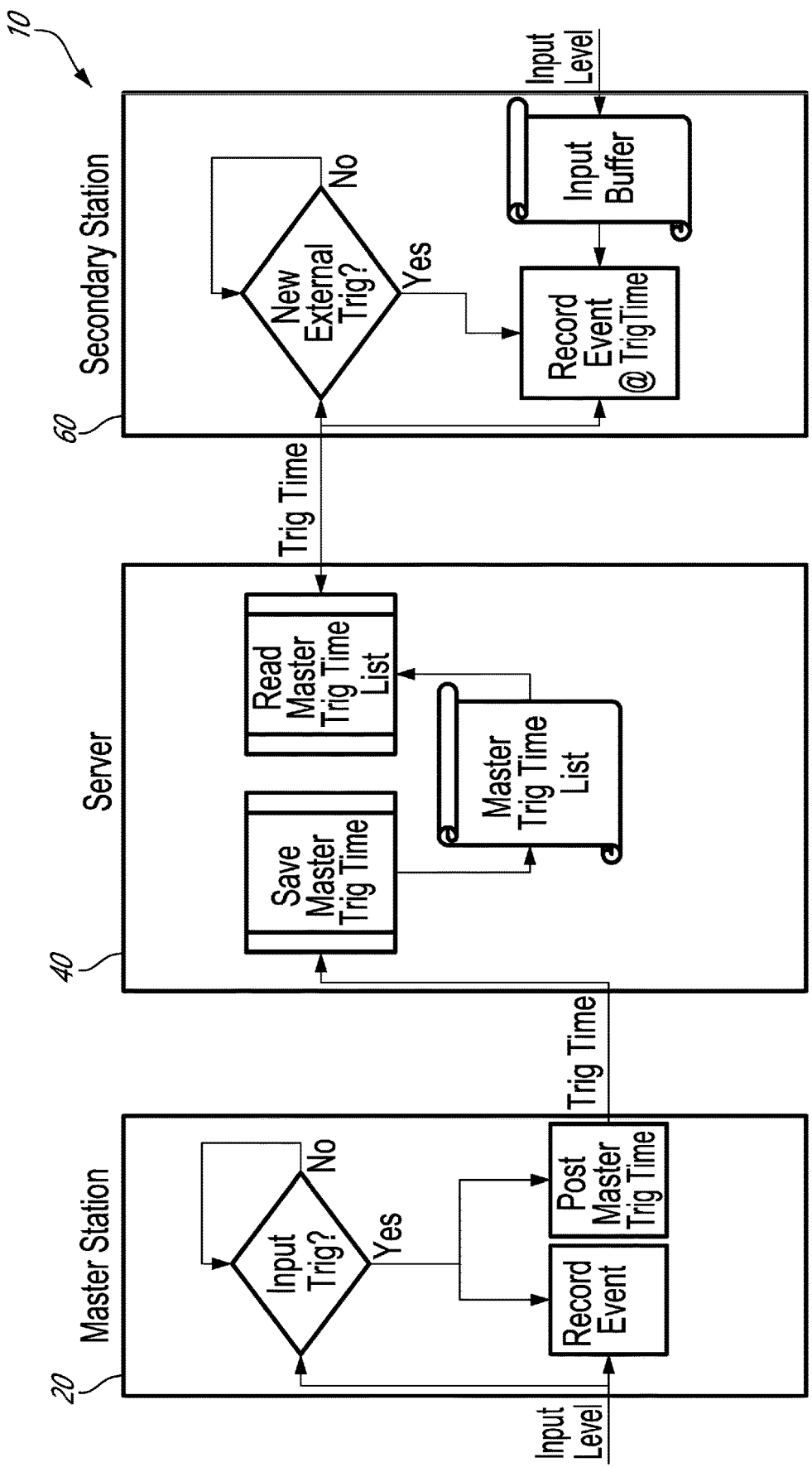
FIG. 1 is a flowchart of a method according to an embodiment of an aspect of the present disclosure.

A system 10 according to an embodiment of an aspect of the present disclosure comprises a master station 20, a secondary station 60 and a server 40. Although only one master station, one server and one secondary station are shown in FIG. 1 for clarity, the system 10 may comprise a plurality of master and secondary stations, depending on the spatial size of the operation site under monitoring or on the number of operation sites to be monitored.

The master station 20 is positioned within the operation site or at a close distance the operation site, i.e. uncontaminated by vibration perturbations that could trigger recordings unrelated to vibration events originating in the operation sites.

The master station 20 comprises a vibration sensor unit set to start measuring vibrations at a master vibration trigger threshold. The master trigger threshold is predetermined above the noise of the vibration sensor unit and below vibration thresholds values as dictated by regulations and/or according to expected vibrations levels originated by vibration sources in the operation site. For example, a 0.5 mm/s peak particle velocity may be selected as the master trigger threshold in case of a typical noise of the vibration sensor unit of 0.1 mm/s and thresholds values as dictated by regulations of 12.7 mm/s.

As long as the master threshold is not exceeded, the main station 20 remains idle and no vibration information is recorded. As soon as the master trigger threshold is exceeded at the master station 20, the master station 20 transmits an event notification, containing the time of the event master, referred to as the master trig time, to a trig time list of the server 40, which triggers recording at the secondary station 60 as will be described hereinbelow, and starts recording the corresponding vibration event, over a length of time referred to as the recording duration. The recording duration is typically predetermined according to the type of expected events, so that the recording duration generally corresponds to expected vibration events durations, in such a way as to record the integrality of the vibration event. For example, a longest event duration in case of planned blasting in a mine being typically of 25 seconds, the recording duration in such application may be preset to 25 seconds. At the end of the recording duration, the master station 20 sends the recorded vibration data to the server 40.

The secondary station 60 may be positioned within the operation site itself or in out-of-the premises neighborhood areas identified as potentially impacted by events originating in the premises of the operation site and therefore are under monitoring, such as nearby facilities or residential buildings for example. The secondary station 60 is in a standby mode, recording ambiant vibration levels in its spatial position in a input circular buffer that typically dynamically stores the last 60 seconds of vibration levels at the position of the secondary station into memory. The secondary stations polls the master trig time list of the server 40 to detect any new master trig time from the master station 20, which generates an external trig (see FIG. 1). The external trig forces recording of the corresponding vibration event detected by the master station at the secondary station, for the recording duration. Data in the circular buffer may be added so as to compensate for the time delay between the start of the recording by the secondary station 60 and the master trig time due to detection time of the external trig by the secondary station 60.

The master and secondary stations are synchronized in time so that the master trig time is the same for all stations, i.e. data recording is triggered at all stations from the master trig time as notified by the event notification emitted by the master station 20. A synchronization method based on a network time protocol (NTP), which provides the system with a precision under 0.1 second, or a precision under 0.001 second using time synchronization method using GPS time (GPST), may be used for example.

The system may comprise a secondary station 60 positioned at a distance from the master station, in an out-of-the premises neighborhood area identified as potentially impacted by the events originating from the operation site, such as a nearby facility or a residential building for example, in such a way as to provide vibration recordings and data independently of local vibrational contaminations.

The secondary station 60 may also be used as a reference to filter false-positive events as will be discussed hereinbelow.

Additional secondary stations 60 may be positioned at a distance from the master station and the first secondary station 60 as references to filter false-positive events independently of the distance from the operating site under monitoring or from local ambient vibration levels. For example, the master station and the first secondary station may be positioned on a northern edge and a southern edge of the operation site respectively. Additional secondary stations 60 may be placed within the operating site at a distance from the master station and the first secondary station or in out-of-the premises neighborhood areas identified as potentially impacted by the events originating from the operation site and therefore are under monitoring, such as nearby facilities or residential buildings for example.

All stations may be provided with remote stable Internet communication link with the server 40. For example, the master station 20 communicates with the secondary stations 60 through the server 40 on the Web using http requests. The server registers the master trig time in the master trig time list. Secondary station 60 listen to the server 40 for any new registered master trig time, which immediately triggers recordings at the secondary stations.

In a method according to an embodiment of an aspect of the present disclosure, as illustrated for example in FIG. 1, when the vibration levels exceeds the master vibration threshold at the master station 20, the master station 20 immediately posts an event notification including the master trig time of the event to the server 40, and starts the recording of the event vibrations, for the predetermined recording duration as described hereinabove. The server 40 records the received event master trig time in the master trig time list upon receipt, as an external trig for secondary stations 60.

When the external trig is detected by the secondary stations 60, the master trig time of the event as recorded in the master trig time list of the server triggers the recording of the corresponding vibratory event by the secondary stations 60. The secondary stations 60 thus use the same trig time as the master station 20 to record the vibratory event, retrieving missed data during any time lap in their respective input buffer to go back in time so as that their recorded data cover the whole event notified by the master station.

The event thus simultaneously recorded by all stations are sent to the server, which stores the event data in an event record file at the end.

Figure 2:
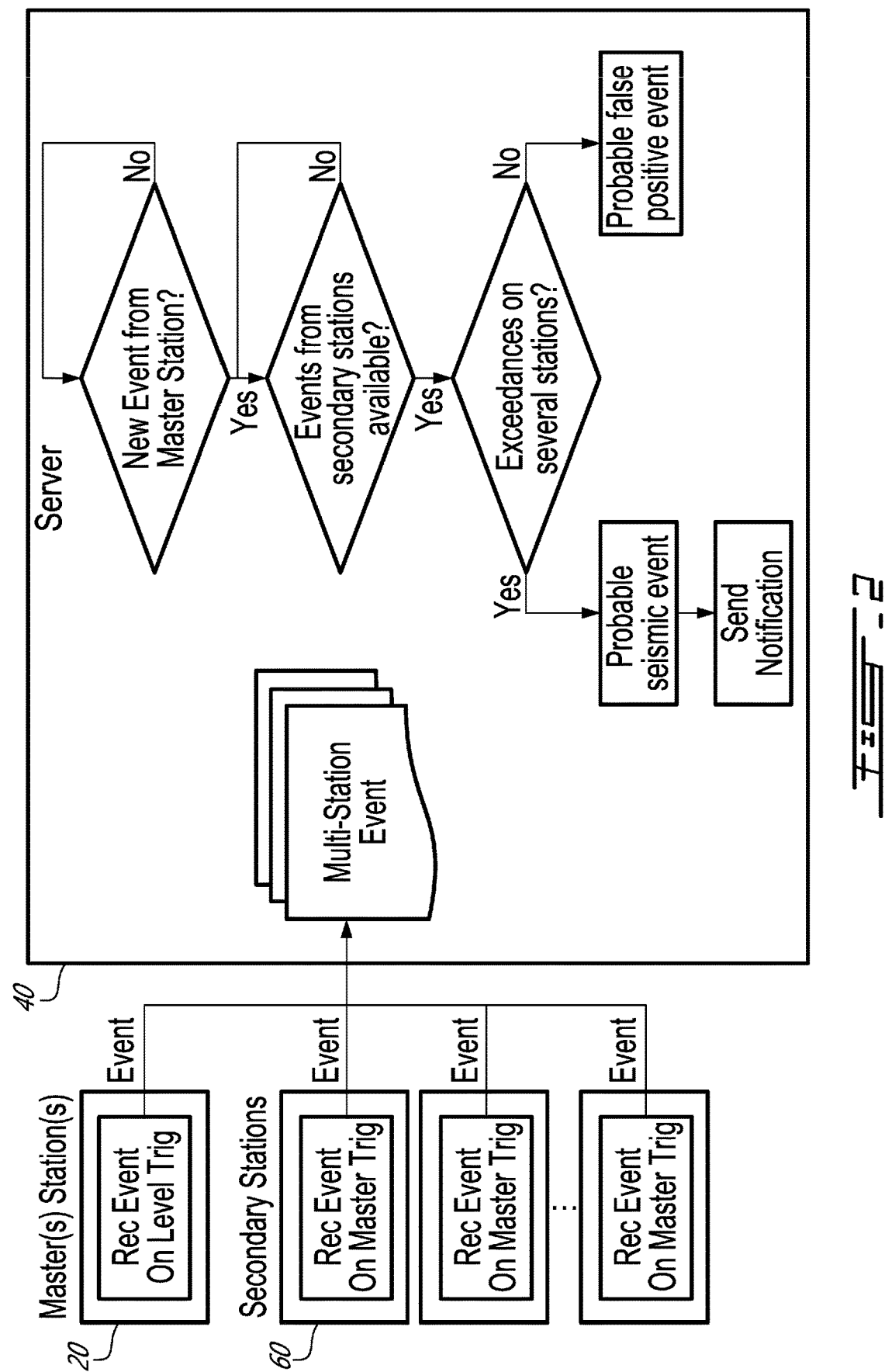
FIG. 2 shows identification of vibration events according to an embodiment of an aspect of the present disclosure.

In a system comprising a plurality of secondary stations 60 as illustrated for example in FIG. 2, as a result of the master trigger time as soon as the threshold at the master station is exceeded, all secondary stations start recording the corresponding vibratory events at their respective position.

The data of the event as recorded by all stations are transmitted to the server 40. If the vibration levels on at least two stations, which typically includes the master station and at least one secondary station identified as sufficiently non contaminated with unrelated vibration events, exceed a respective seismic threshold, the recorded vibration event is classified as probable seismic event, i.e. originating in the operation site as opposed to due to events unrelated to the operating site and a notification message is emitted. If only one station exceeds its seismic threshold, the event is classified as false-positive and no notification message is issued.

The seismic threshold is selected independently on each stations according to a respective average ambiant vibration level at their respective local position and monitoring targets. For example, an event may be classified as a probable seismic event in a case when vibrations reach 0.5 mm/s at the master station and 0.4 mm/s at a secondary station; or in a case when 3 stations out of four in a four stations system exceed 0.25 mm/s, depending of context.

Data from secondary stations 60 may be selectively included in the events classification criteria according to their respective distance from the event source, on the basis that data from more distant secondary stations may be increasingly submitted to local ambient vibration contamination or events unrelated to the operating site and may thus be less reliable in the events classification.

Interestingly, since the master and secondary stations are synchronized, the spatial origin of a vibration event may be identified in data post processing by triangulation or pseudorange multilateration for example.

An autonomous interconnected network for vibration monitoring according to an embodiment of an aspect of the present disclosure as schematically illustrated in FIG. 3 comprises a system 10 positioned in relation to an operation site as discussed hereinabove. The interconnected network of autonomous vibration sensors of the stations of the system 10 monitors events originating from the operation site as discussed hereinabove. Different alarm messages may be selected and set depending on the applications and monitoring targets. For example, alarms of threshold overruns may be set, with a number of different alarm thresholds and/or adjustable thresholds. Reports may be automatically delivered, by email for example, and controllers of the operating site be provided with corresponding vibration data.

The master trigger threshold may be selected depending on the applications and monitoring targets. In case the master trigger threshold is reached, measurement and recording is activated on all stations, as described hereinabove, independently of their respective local position and ambiant vibration levels, as described hereinabove. All recorded data are transferred to the server and stored in an event file, and an automated event report integrating these data from all stations, including a summary of master trigger data, may be generated, thereby providing a real time set of data from the entire system during the vibration event.

The present system and method further allow sorting out vibration events originated by the operation site from unrelated events, such as for example vibration events due to walking, lawn mowing, trucks on roads, etc., thereby reducing the number of false positives.

In relation to operation sites impact monitoring, regulation standards typically recommend that the thresholds be higher than the background vibration levels in the monitored area so as to prevent overloading the memory capacity of the monitoring sensors, considering that in a number of environments, such as busy neighborhoods in commercial, industrial or residential areas for example, a range of vibration sources unrelated to the operation sites can generate vibrations, such as for example mowers, cars, trucks, persons walking by the stations etc. Such thresholds are typically of about 12.7 mm/s, in contrast to the human vibrations perception threshold, which is typically of about 0.14 mm/s.

The present method and system provide a measuring and recording mode independent of spatial localisation. Thus, all vibration events originating in an operation site are tracked and documented. The vibration events generated by operation sites, such as blasting or other planned vibration events or other events taking place in the operation sites, are documented by a comprehensive data set of vibration levels, which may be used to improve or mitigate impacts of these events in their neighborhood environment.

The method comprises forcing measurement on stations so as to collect a complete set of vibration data, which may then be used to improve vibration propagation models or to solve issues with a neighborhood community in inhabited environments for example. By comparing the vibration levels between a plurality of stations, vibrations originated by an operation site are discriminated from unrelated events, so as to reduce occurrences of, or suppress, false positive alerts.

The scope of the claims should not be limited by the illustrated embodiments set forth in the examples, but should be given the broadest interpretation consistent with the description as a whole.

The invention claimed is:

1. A system for vibration monitoring, comprising:
a master station preset for recording vibrations at a master trigger threshold;
a secondary station, the secondary station and the master station being time synchronized,
a server in communication with the master and secondary station;
wherein said master station is positioned at a position uncontaminated by vibration perturbations unrelated to vibration events originating in the operation site; said secondary station is positioned at a position potentially impacted by the vibration events originating in the operation site;
wherein the master station is configured to transmit a master trig time to said server and to start recording vibrations as soon as the master trigger threshold is exceeded; said server is configured to store the master trig time; said secondary station is configured to detect the master trig time stored by the server, and upon detecting the master trig time, to record vibrations;
wherein said master and secondary stations are configured to transmit respective recorded vibrations to said server and said server is configured to classify the recorded vibrations in relation to respective preset seismic thresholds of the master station and the secondary station, and:
i) if the vibration levels on the master station and the secondary station exceed a respective seismic threshold, the server detects an event originating in the operation site and emits a notification message;
ii) if only one of the master station and the secondary station exceeds its respective seismic threshold, the server detects a false-positive event.

2. The system of claim 1, wherein said secondary station comprises a buffer, said buffer being configured to dynamically store vibrations at a position of the secondary station while in a standby mode prior to detecting the master trig time.

3. The system of claim 1, wherein said secondary station comprises a buffer, said buffer being configured to dynamically store a duration of occurring vibrations at a position of the secondary station while in a standby mode prior to detecting the master trig time, and to retrieve vibrations missed during a time lap of the detection of the master trig time in the server.

4. The system of claim 1, wherein the master station is positioned at a first position and the secondary station is positioned at a second position different from said first position and impacted by vibrations at the first position.

5. The system of claim 1, wherein the master station is positioned at a first position within the operation site; and the secondary station is positioned in a second position different from said first position and impacted by vibrations at the first position.

6. The system of claim 1, wherein the master trigger threshold is selected depending on the operating site.

7. The system of claim 1, wherein forced vibration recording is activated at the secondary station by the master trig time independently of local vibrations at the position of the secondary station.

8. The system of claim 1, wherein said server generates a classification of the vibration event from the recorded vibrations transmitted by said master and secondary stations.

9. The system of claim 1, wherein the master and the secondary station are time synchronized based on one of: i) a network time protocol and ii) GPS time.

10. The system of claim 1, wherein when the master trigger threshold is exceeded, the master station starts recording vibrations, and the master station stops recording vibrations after a recording duration, said recording duration being preset according to a type of expected vibration events in the operating site.

11. The system of claim 1, wherein the server is remotely connected to the master station and the secondary station.

12. The system of claim 1, wherein the server is connected to the master station and the secondary station using a http communication protocol over a standard internet link.

13. The system of claim 1, comprising a first secondary station and a second secondary station, wherein the master station is positioned at a first position impacted by vibrations occurring in the operation site, said first secondary station is positioned at a second position impacted by the vibrations occurring in the operation site and the second secondary station is positioned at a third position impacted by vibrations occurring in the operation site.

14. The system of claim 1, wherein a spatial origin of the recorded vibrations is obtained by one of triangulation and pseudorange multilateration.

15. A method for vibration monitoring, comprising:
 positioning a master station preset for vibration recording at a master trigger threshold at a first position in an operating site;
 positioning at least one secondary station in a second position impacted by vibrations occurring in the first position, the at least one secondary station continuously recording a time length of vibrations at the second position in a standby mode;
 synchronizing the at least one secondary station and the master station in time;
 connecting the master station and the least one secondary station to a server;
 whereby, when the master trigger threshold is exceeded, the master station transmits a master trig time to the server and starts recording vibrations; the server storing the master trig time; the at least one secondary station detecting the master trig time stored by the server, and upon detecting the master trig time, starts recording vibrations; the master and the at least one secondary station transmitting respective recorded vibrations to the server and the server classifying received recorded vibrations in relation to preset seismic thresholds and:
  i) if the vibration levels on at least two of the master station and the at least one secondary station exceed a respective seismic threshold, the server detects an event originating in the operation site and emits a notification message;
  ii) if only one of the master station and the at least one secondary station exceeds its respective seismic threshold, the server detects a false-positive event.

16. The method of claim 15, wherein the at least one secondary station dynamically stores occurring vibrations data at a position thereof in the standby mode prior to detecting the master trig time and retrieves vibration data missed during a time lap of transmission of the master trig time from the master station.

17. The method of claim 15, wherein the master station is positioned at a first position in relation to the operating site; and the at least one secondary station is positioned at a second position impacted by vibration events at the first position.

18. The method of claim 15, wherein forced vibration recording is activated at the at least one secondary station by the master trig time independently of local vibrations at the second position.

19. The method of claim 12, comprising determining a spatial origin of the recorded vibrations by one of triangulation and pseudorange multilateration.

20. An autonomous interconnected network for vibration monitoring, comprising a master station preset for recording vibrations at a master trigger threshold; a secondary station, the secondary station and the master station being time synchronized, a server in communication with the master and the secondary station; wherein, the master station is configured to transmit a master trig time to said server and to start recording vibrations when the master trigger threshold is exceeded; said server is configured to store the master trig time; said secondary station is configured to detect the master trig time stored by the server, and upon detecting the master trig time, to record vibrations; wherein said master and secondary station are configured to transmit respective recorded vibrations to said server and said server is configured to classify the recorded vibrations in relation to a preset seismic threshold and, if the vibration levels on the master station and the secondary station exceed a respective seismic threshold, the server detects an event originating in the operation site.

* * * * *